United States Patent [19]

Takemoto et al.

[11] Patent Number: 4,866,292

[45] Date of Patent: Sep. 12, 1989

[54] SOLID-STATE IMAGING SYSTEM WITH AN ELECTRONIC AUTO-STOP (IRIS) RESPONSIVE TO AN OUTPUT POTENTIAL OF IMAGING SIGNAL

[75] Inventors: Iwao Takemoto; Tetsurou Izawa; Hiroichi Sokei, all of Mobara; Toshiki Suzuki, Chiba, all of Japan

[73] Assignee: Hitachi, Ltd., Tokyo, Japan

[21] Appl. No.: 102,649

[22] Filed: Sep. 30, 1987

[30] Foreign Application Priority Data

Oct. 1, 1986 [JP] Japan ................................ 61-231153

[51] Int. Cl.[4] .............................................. H04N 3/14
[52] U.S. Cl. ................................ 250/578; 358/213.22
[58] Field of Search .................... 250/578; 358/213.22, 358/213.19, 213.29, 213.26

[56] References Cited

U.S. PATENT DOCUMENTS

| 4,335,405 | 6/1982 | Sakane et al. ........................ 358/213 |
| 4,392,158 | 7/1983 | Akoi .............................. 358/213.22 |
| 4,553,167 | 11/1985 | Kinoshita ........................ 358/213.22 |

Primary Examiner—David C. Nelms
Assistant Examiner—Stephone B. Allen
Attorney, Agent, or Firm—Antonelli, Terry & Wands

[57] ABSTRACT

Disclosed is a solid state imaging system with a variable sensitivity function in which the sensitivity of the image sensor device is varied in response to the output level of the device.

12 Claims, 3 Drawing Sheets

SOLID-STATE IMAGING SYSTEM WITH AN ELECTRONIC AUTO-STOP (IRIS) RESPONSIVE TO AN OUTPUT POTENTIAL OF IMAGING SIGNAL

BACKGROUND OF THE INVENTION

1. Field of the Invention

The present invention relates to a solid-state image sensor and, more particularly, to a technique which may effectively be used for, for example, image input devices for recording still images such as the images of letters and figures.

2. Description of the Related Art

One type of solid-state image sensor which consists of a combination of photodiodes and switching MOSFETs has heretofore been known. This type of solid-state image sensor is disclosed, for example, in Japanese Patent Laid-Open No. 56- 152382(152382/1981). Solid-state image sensors of the type described above are used in television cameras for monitoring or those for domestic use. In such a television camera, an optical lens is provided with an automatic diaphragm mechanism.

The above-described lens that is provided with an automatic diaphragm mechanism needs relatively complicated mechanical parts, and this leads to an increase in size of the lens unit in a television camera and a rise in the production cost and also involves inferior response. For this reason, devices that utilize such optical lenses, e.g., image input devices for recording letters or figures, suffer from the problem that the digital pattern processing as a pre-processing for recognizing such still images is complicated. More specifically, in the case of continuously inputting images of objects such as a document consisting of a plurality of letters or figures which are drawn on different plurality of kinds of paper or the like having different levels of lightness, there may be variations in level of picture signals obtained in accordance with the level of the lightness of the paper. Further, since the above-described automatic diaphragm mechanism is composed of relatively complicated mechanical parts, the mechanical portions may become worn, and the mechanism is therefore unsatisfactory in terms of reliability.

SUMMARY OF THE INVENTION

In view of the above-described circumstances, it is a primary object of the present invention to provide a solid-state image sensor which is capable of processing still picture signals at high speed.

To this end, the present invention provides a solid-state state image sensor in which, in addition to a first scanning circuit which obtains a time-series output of signals from a plurality of picture element cells which are arrayed two-dimensionally, a second scanning circuit which effects a select operation in the vertical scanning direction with addresses independent of the select addresses in the vertical scanning direction which are used by the first scanning circuit, whereby the sensitivity is made variable by the control of the storage time, and the scanning timing of the second scanning circuit is controlled so that the peak value (white level) of the output signal is maintained at a constant level by utilizing the sensitivity variable function of the solid-state image sensor circuit.

By virtue of the above-described means, the vertical scanning operation of the second scanning circuit is effected so that the peak value (white level) of the output signal is maintained at a constant level. Therefore, it is possible to make constant the level of picture signals obtained from a plurality of kinds of documents or drawings having different levels of background lightness due to different paper qualities, and it is possible to readily execute the digital pattern processing of the picture signals.

The above and other objects, features and advantages of the present invention will become more apparent from the following description of the preferred embodiments thereof taken in conjunction with the accompanying drawings.

DESCRIPTION OF THE PREFERRED EMBODIMENTS

The present invention will be described hereinunder in detail with reference to the accompanying drawings.

Figure 3:
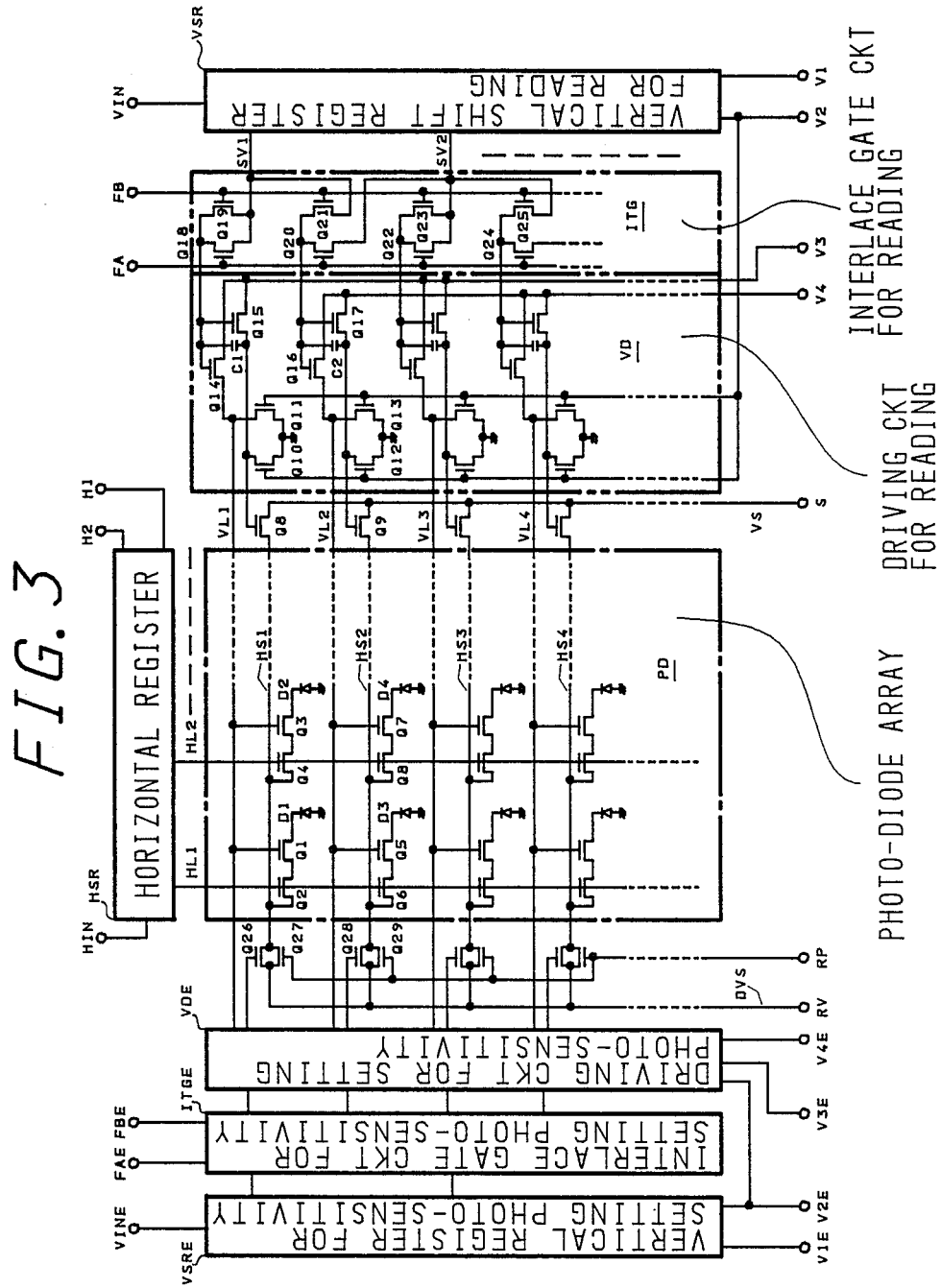
FIG. 3 is a circuit diagram showing one example of a solid-state image sensor circuit having a sensitivity variable function which may be employed in the present invention.

FIG. 3 is a circuit diagram showing one example of a TSL (Transversal Signal Line) system MOS type solid-state image sensor circuit which may be employed in the solid state image sensor according to the present invention and which enables the level of sensitivity thereof to be variable. The circuit elements shown in FIG. 3 are fabricated on a single semiconductor substrate such as single crystal silicon by a known semiconductor integrated circuit manufacturing technique, although not necessarily limited thereto. Principal circuit blocks shown in the figure are drawn in conformity with the actual geometrical layout on a semiconductor chip.

A picture element array PD will first be explained. In FIG. 3, a part of the array PD which consists of four rows and two columns is representatively illustrated. In order to prevent complication of the illustration, circuit symbols are put only to picture element cells for two rows among the four rows. One picture element cell is defined by a series circuit which consists of a photodiode D1, a switching MOSFET Q1 having its gate coupled to a vertical scanning line VL1, and a switching MOSFET Q2 having its gate coupled to a horizontal scanning line HL1. The respective output nodes of the other similar picture element cells (D2, Q3, Q4 which are disposed along the same row (in the horizontal direction) as the picture element cell composed of the photodiode D1 and the switching MOSFETs Q1 and Q2 are coupled to a horizontal signal line HS1 which extends horizontally as viewed in the figure. Similarly, picture element cells which are the same as the above are coupled in regard to the other rows.

The horizontal scanning line HL1 which is exemplarily illustrated extends vertically as viewed in the figure and is coupled in common to the gates of switching MOSFETs Q2, Q6 . . . of picture element cells which are disposed along the same column, picture element cells which are disposed along the other columns are also coupled to the corresponding horizontal scanning lines HL2 in the same way as the above.

In this embodiment, switching MOSFETs Q8, Q9 and Q26, Q28 are provided at both ends, respectively, of the horizontal signal lines HS1 to HS4 . . . which constitute the picture element array PD, in order to add a virtual automatic diaphragm function to the solid-state image sensor circuit, that is, in order to make variable the substantial storage time with respect to the photodiodes. The switching MOSFETs Q8 and Q9 are disposed at the right-hand end operate so as to couple the respective horizontal signal lines HS1 and HS2 to an output line VS which extends vertically. The output line VS is coupled to a terminal S through which a read-out signal is transmitted to the input terminal of a preamplifier which is externally provided. The switching MOSFETs Q26 and Q28 which are disposed at the left-hand end operate so as to couple the respective horizontal signal lines HS1 and HS2 to a dummy (reset) output line DVS which extends vertically. Although not necessarily limited, thereto the output line DVS is coupled to a terminal RV so that it is possible to deliver to the outside a signal output to the dummy output line DVS as desired.

In this embodiment, the horizontal signal lines HS1 to HS4 for the exemplarily illustrated four rows are respectively provided with switching MOSFETs Q27, Q29 which are turned ON in response to a reset signal that is supplied from a terminal Rp during the horizontal blanking period, although not necessarily limited thereto. When the MOSFETs Q27, Q29 are turned ON, a predetermined bias voltage is applied to each of the horizontal signal lines HS1 to HS4 from the terminal RV through the dummy output line DVS. The reason why the MOSFETs Q27, Q29 for resetting are provided is as follows. Semiconductor regions such as the drains of the switching MOSFETs which are coupled to the horizontal signal lines HS1 to HS4 may also have sensitivity to light, and therefore false signals (which may cause smear or blooming) formed by such parasitic photodiodes may be accumulated on the horizontal signal lines which are floating when they are in a non-select state. Therefore, in this embodiment all the horizontal signal lines HS1 to HS4 are reset to a predetermined bias voltage VB by making use of the horizontal blanking period as described above. Thus, in regard to each of the selected horizontal signal lines, a picture signal is always taken out in a state wherein the above-described false signals are reset, and it is therefore possible to reduce false signals contained in the output picture signal by a large margin. It should be noted that the false signals (causing smear or blooming) are described in detail, for example, in Japanese Patent Laid-Open No. 57-17276(17276/1982).

The horizontal scanning lines HL1, HL2 . . . are supplied with a horizontal scanning signal which is formed in a horizontal shift register HSR.

The scanning circuit which effects a vertical select operation (i.e., horizontal scanning operation) in the abovedescribed picture element array PD is composed of the following circuits.

In this embodiment, a pair of scanning circuits are provided in conformity with the provision of the pairs of switching MOSFETs Q8, Q9 . . . and Q26, Q28 . . . at both ends of the horizontal signal lines HS1 to HS4 . . . in the picture element array PD.

In order to enable application to industrial uses, this embodiment is arranged so that it is possible to effect scanning processes in addition to the interlaced scanning, i.e., a scanning process in which two rows can be selected simultaneously, and a non-interlaced scanning process. The following scanning circuit is provided at the right-handside of the picture element array PD. Namely, a vertical shift register VSR forms output signals SV1, SV2 . . . which are employed for reading. These output signals SV1, SV2 are supplied to the vertical scanning lines VL1 to VL4 and also to the gates of the switching MOSFETs Q8, Q9 through an interlace gate circuit ITG and a driver circuit VD.

The interlace gate circuit ITG operates in the following manner in order to effect a vertical select operation (i.e., horizontal scanning operation) in the interlace mode. Namely, in the case of a first (odd-number) field, the vertical scanning lines VL1 to VL4 are selected in such a manner that a combination of adjacent vertical scanning lines, i.e., one scanning line VL1 and a pair of adjacent vertical scanning lines VL2 and VL3, are simultaneously selected. More specifically, the output signal SV1 from the vertical shift register VSR is output to the vertical scanning line VL1 for selecting the horizontal signal line HS1 by the operation of a switching MOSFET Q18 which is controlled by an odd-number field signal FA. Similarly, the output signal SV2 from the vertical shift register VSR is output to both the vertical scanning lines VL2 and VL3 so as to simultaneously select the horizontal signal lines HS2 and HS3 by the operation of switching MOSFETs Q20 and Q22 controlled by the signal FA. Thereafter, select signals for selecting a pair of horizontal signal lines which are combined according to the same sequence as the above are formed.

In the case of a second (even-number) field, the vertical scanning lines VL1 to VL4 are selected in such a manner that a combination of adjacent vertical scanning lines, i.e., two pairs of vertical scanning lines VL1, VL2 and VL3, VL4 are simultaneously selected. More specifically, the output signal SV1 from the vertical shift register VSR is output to the vertical scanning lines VL1 and VL2 for selecting the horizontal signal lines HS1 and HS2 by the operation of switching MOSFETs Q19 and Q21 which are controlled by an even-number field signal FB. Similarly, the output signal SV2 from the vertical shift register VSR is output to the vertical scanning lines VL3 and VL4 so as to simultaneously select the horizontal signal lines HS3 and HS4 by the operation of switching MOSFETs Q23 and Q25 which are controlled by the signal FB. Thereafter, select signals for selecting a pair of horizontal signal lines which are combined according to the same sequence as the above are formed.

A plurality of different kinds of horizontal scanning operation which will be explained hereinafter are realized by a combination of the above-described interlace gate circuit ITG and the driver circuit DV described below.

The output signal from the interlace gate circuit ITG which corresponds to the above-described one vertical scanning line VL1 is supplied to the gates of switching MOSFETs Q14 and Q15. The mutual drain electrode of these switching MOSFETs Q14 and Q15 is coupled to a terminal V3. The switching MOSFET Q14 supplies a signal supplied thereto from the terminal V3 to the vertical scanning line VL1. The switching MOSFET Q15 supplies a signal supplied thereto from the terminal V3 to the gate of the switching MOSFET Q8 which couples the horizontal signal line HS1 to the output line VS. In order to prevent the high level of the output signal from lowering by an amount corresponding to the threshold voltage of the switching MOSFETs Q14 and Q15, a capacitor C1 is provided between the gate of the MOSFET Q14 and the output side (source side) of the MOSFET Q15, although not necessarily limited thereto. Thus, when the output signal from the interlace gate circuit ITG is raised to the high level, the potential at the terminal V3 is maintained at the low level and in the meantime the capacitor C1 is precharged. When the potential at the terminal V3 is raised to the high level thereafter, the gate voltage of the MOSFETs Q14 and Q15 can be raised by the bootstrap action by the capacitor C1.

The output signal from the interlace gate circuit ITG which corresponds to the vertical scanning line VL2 which is adjacent to the above-described vertical scanning line VL1 is supplied to the gates of switching MOSFETs Q16 and Q17. The mutual drain electrode of these switching MOSFET Q16 and Q17 is coupled to a terminal V4. The switching MOSFET Q16 supplies a signal supplied thereto from the terminal V4 to the vertical scanning line VL2. The switching MOSFET Q17 supplies a signal supplied thereto from the terminal V4 to the gate of the switching MOSFET Q9 which couples the horizontal signal line HS2 to the output line VS. In order to prevent the high level of the output signal from lowering by an amount corresponding to the threshold voltage of the switching MOSFETs Q16 and Q17, a capacitor C2 is provided between the gate of the MOSFET Q16 and the output side (source side) of the MOSFET Q17, although not necessarily limited thereto. Thus, the gate voltage of the MOSFETs Q16 and Q17 can be raised by the bootstrap action by the capacitor C2 by changing the potential at the terminal V4 at the same timing as that described above.

The terminal V3 is provided in common to switching MOSFETs for driving which are provided in correspondence with odd-number vertical scanning lines (horizontal signal lines), while the terminal V4 is provided in common to even number vertical scanning lines (horizontal signal lines).

As will be understood from the foregoing, it is possible to effect a read operation in the interlace mode by combining together the operation of selectively supplying timing signals to the terminals V3 and V4 and the operation of selecting two rows simultaneously which is effected by the interlace gate circuit ITG. For example, if, in the case of an odd-number field FA, the terminal V3 is supplied with a timing signal synchronized with the operation of the vertical shift register VSR with the terminal V4 placed at the low level, the vertical scanning lines (horizontal lines) can be selected in the following sequence: VL1 (HS1), VL3 (HS3) .... In the case of an even-number field FB, the terminal V4 is supplied with a timing signal synchronized with the operation of the vertical shift register VSR with the terminal V3 placed at the low level, and it is thereby possible to select the vertical scanning lines (horizontal signal lines) in the following sequence: VL2 (HS2), VL4 (HS4) ...

On the other hand, if the terminals V3 and V4 are simultaneously raised to the high level in the same manner as the above, a scanning process in which a pair of rows are simultaneously selected can be effected in accordance with the output signals from the interlace gate circuit ITG. In this case, since the combination of pairs of rows which are selected for each of the two fields in accordance with the field signals FA and FB is shifted vertically by an amount corresponding to one row as described above, it is possible to realize a vertical shift of spatial centroid, that is, an equivalent interlace mode.

If, for example, the signal FB alone is raised to the high level, and the horizontal shift register HSR is operated twice in response to one vertical scanning timing to raise the terminals V3 and V4 to the high level synchronously therewith, it is possible to realize a select operation in the non-interlace mode in which the vertical scanning lines are selected in the following sequence: VL1, VL2, VL3, VL4 In this case, it is preferable to double the frequency of the clock signals which are supplied to the horizontal shift register HSR and the vertical shift register VSR with a view to improving the picture quality. More specifically, if the frequency of the clock signals which are supplied to the horizontal and vertical shift registers HSR and VSR from terminals H1, H2 and V1, V2 is doubled, it is possible to read 60 pictures per minute in the non-interlace mode. It should be noted that terminals HIN and VIN supply input signals which are to be shifted by the shift registers HSR and VSR, respectively, and the shift operation of each shift register is started from the time when the input signal is supplied thereto. Accordingly, in the case where the above-described double-row simultaneous read scanning, interlaced scanning, non-interlaced scanning and the like are effected in accordance with the combination of input signals supplied to the interlace gate circuit ITG and the input terminals V3, V4, timing must be taken into consideration when the input signal is supplied to the shift register VSR so that the positional relationship between output signals in the vertical direction will not be reversed.

Resetting MOSFETs Q10 and Q11 are provided between the vertical scanning line VL1, the gate of the switching MOSFET Q8 corresponding thereto, and the ground potential point of the circuit. These resetting MOSFETs Q10 and Q11 are supplied with the clock signal from the terminal V2, the clock signal being supplied in common to all resetting MOSFETs provided in correspondence with the other vertical scanning lines and their corresponding switching MOSFETs, and the MOSFETs Q10 and Q11 operate to quickly draw the potential of the vertical scanning line in a selected state and the gate potential of the corresponding switching MOSFET to the low level.

In this embodiment, a vertical shift register VSRE, an interlace gate circuit ITGE and a driver circuit DVE for sensitivity control are additionally provided in order to add a sensitivity variable function. These circuits for sensitivity control are disposed on the left-hand side of the picture element array PD, although not necessarily limited thereto. The vertical shift register VSRE, interlace gate circuit "ITGE" and driver circuit DVE have circuit configurations similar to those of the abovedescribed vertical shift register VSR, interlace gate circuit ITG and driver circuit DV for reading. Timing signals which are similar to the above are supplied from terminals VIE to V4E, VINE, FAE and "FBE," respectively. In this case, the terminals V1E and V1 and the terminals V2E and V2 are supplied with the same clock signals, respectively, in order to allow the vertical shift register VSR for reading and the vertical shift register VSRE for sensitivity control to operate synchronously with each other, although not necessarily limited thereto. Accordingly, the terminals V1E and V1 and the terminals V2E and V2 may be made common to each other, respectively, by an internal circuit. The reason why the independent terminals V1E and V2E are provided as described above is to enable this solid-state image sensor to be applied to television cameras having manually-operated diaphragms or a conventional mechanical diaphragm function. Thus, consideration is taken so that, when no sensitivity control operation is effected, the terminals V1E and V2E are placed at a low level such as the ground potential of the circuit to thereby prevent electric power from being wastefully consumed in the vertical shift register VSRE.

The following is a description of the sensitivity control operation of the solid-state image sensor circuit in accordance with this embodiment.

To facilitate the explanation, the vertical scanning operation in the above-described non-interlace mode will be exemplified in the following description. For example, the vertical shift register VSRE, interlace gate circuit ITGE and driver circuit DVE for sensitivity control are made to effect a select operation for the fourth row (the vertical scanning line VL4; the horizontal signal line HS4) in parallel to the read operation for the first row (the vertical scanning line VL1; the horizontal signal line HS1) effected by the vertical shift register VSR, interlace gate circuit ITG and driver circuit DV for reading. Thus, photo signals accumulated in the photodiodes D1, D2 . . . in the first row are read out to the output signal line VS in a time-series manner in synchronism with the select operation for the horizontal scanning lines HL1, HL2 . . . in response to the horizontal scanning signal formed in the horizontal shift register HSR. This read operation is carried out by the supply of a current corresponding to each of the photo signals from the terminal S through a load resistor, and the precharge (reset) operation is carried out simultaneously with the read operation. A similar operation is also effected for the photodiodes disposed along the fourth row. In this case the read operation for the fourth row is effected with respect to the dummy output line DVS by the above-described scanning circuit (VSRE, ITGE and DVE) for sensitivity control. In the case where the sensitivity control operation alone is conducted, the terminal RV is supplied with the same bias voltage as that applied to the terminal S. Thus, the photo signal which has already been accumulated in each of the picture element cells disposed along the fourth row is swept out, that is, a reset operation is effected.

Accordingly, the read operation for the fourth row (the vertical scanning line VL4; the horizontal signal line HS4) by the vertical shift register VSR, interlace gate circuit ITG and driver circuit DV is carried out after the read operation for the first to third lines by the abovedescribed vertical scanning operation. Therefore, the storage time of the photodiode in each of the picture element cells disposed along the fourth row is equal to the time which is required to read all the picture element cells for the three rows.

In place of the above-described operation, the vertical shift register VSRE, interlace gate circuit ITGE and driver circuit DVE for sensitivity control are made to effect a select operation for the second row (the vertical scanning line VL2; the horizontal signal line HS2) in parallel to the read operation for the first row (the vertical scanning line VL1; the horizontal signal line HS1) effected by the vertical shift register VSR, interlace gate circuit ITG and driver circuit DV for reading. Thus, photo signals accumulated in the photodiodes D1, D2 . . . in the first row ar read out to the output signal line VS in a time-series manner in synchronism with the select operation for the horizontal scanning lines HL1, HL2 in response to the horizontal scanning signal formed in the horizontal shift register HSR. This read operation is carried out by the supply of a current corresponding to each of the photo signals from the terminal S through a load resistor, and the precharge (reset) operation is carried out simultaneously with the read operation. A similar operation is also effected for the photodiodes D3, D4 . . . which are disposed along the second row. Thus, the photo signal which has already been accumulated in each of the picture element cells disposed along the second row is swept out, that is, a reset operation is effected. Accordingly, the read operation for the second row (the vertical scanning line VL2; the horizontal signal line HS2) by the vertical shift register VSR, interlace gate circuit ITG and driver circuit DV is carried out after the read operation for the first row by the above-described vertical scanning operation. Therefore, the storage time of the photodiode in each of the picture element cells disposed along the second row is equal to the time which is required to read all the picture element cells for one row. Thus, the virtual storage time of the photodiodes can be reduced to one third of that in the case of the above, that is, it is possible to lower the sensitivity to one third of that in the above-described case.

As described above, the picture element cells disposed along a particular row are reset by the preceding vertical scanning operation carried out by the scanning circuit for sensitivity control. Therefore, the time interval from the reset operation to the start of the actual read operation carried out by the scanning circuit for reading is determined to be a storage time for the photodiodes. Accordingly, in a picture element array consisting of 525 rows, it is possible to set a storage time over a considerably wide range, i.e., in 525 steps at maximum with the read time for one row as a unit (minimum storage time or lowest sensitivity), that is, it is possible to set sensitivity at any of 525 levels, by the different addressing operations conducted by the above-described two vertical scanning circuits and the picture element select operation conducted by the common horizontal scanning circuit. However, it is assumed that variations in the illuminance at the light-receiving surface may be ignored with respect to the scanning time for the above-described one frame and substantially constant light is incident on the photodiodes. It should be noted that the highest sensitivity (525) is obtained when the scanning circuit for sensitivity control is in an inoperative state.

Figure 1:
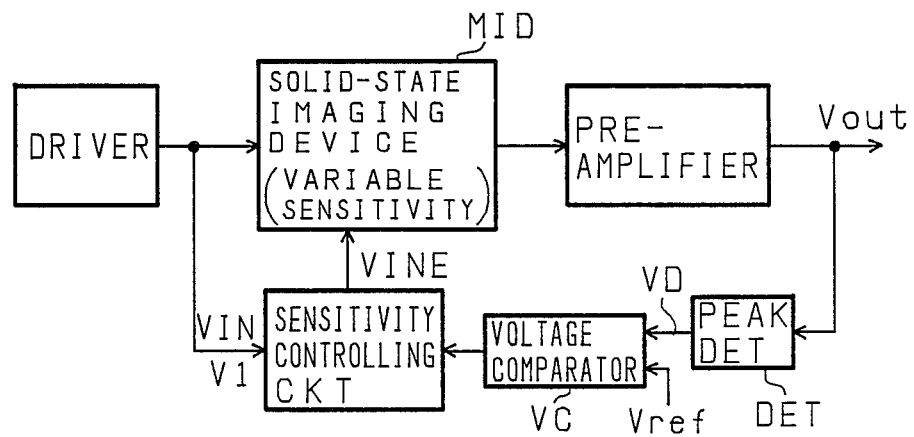
FIG. 1 is a block diagram of one embodiment of the solid-state image sensor according to the present invention.

FIG. 1 is a block diagram of one embodiment of the solid-state image sensor for inputting still images which employs the above-described solid-state image sensor circuit.

The solid-state image sensor circuit MID has a sensitivity variable function such as that shown in FIG. 3. The read-out signal which is output from the solid-state image sensor circuit MID is amplified in a preamplifier. The amplified signal V out is supplied to a signal processing circuit (not shown) where, for example, it is formed into a digital pattern and a pattern recognition processing is carried out. The amplified signal V out is also utilized for automatic diaphragm control. More specifically, the amplified signal V out is detected by a peak detecting circuit DET. The circuit DET detects and holds a peak value (white level) of the amplified signal V out. An output voltage VD which corresponds to the white level detected by the peak detecting circuit DET is input to a voltage comparing circuit VC, although not necessarily limited thereto. The circuit VC detects the size of the output voltage VD by comparing it with a predetermined reference voltage Vref. If, for example, the output voltage VD is larger than the reference voltage Vref, the circuit VC forms a high-level output signal, whereas, if the output voltage VD is smaller than the reference voltage Vref, the circuit VC forms a low-level output signal.

The sensitivity control circuit is supplied with the output signal from the voltage comparing circuit VC and signals VIN and V1 from a driver circuit which supplies the solid-state image sensor circuit MID with a clock signal for controlling the above-described scanning timing, and the sensitivity control circuit refers to the read timing of the solid-state image sensor circuit MID and forms a signal. VINE which subtantially precedes said read timing. More specifically, on the basis of the timing signal VIN, the sensitivity control circuit forms a timing signal VINE which precedes the timing signal VIN in accordance with the necessary aperture (sensitivity); therefore, in actuality, the signal VINE is formed after the timing signal VIN. However, since scanning is repeatedly carried out, the signal VIN seems to be formed after the signal VINE in the subsequent scanning of the frame. More specifically, if the timing signal VINE is generated at a time corresponding to one row after the timing signal VIN, in the subsequent scanning, the timing signal VINE is regarded as preceding the timing signal VIN by a period of time corresponding to 524 rows. Since the shift operations of the vertical shift registers VSR and VSRE are started in response to the timing signals VIN and VINE, respectively, a sensitivity control operation such as that described above is thus effected.

The sensitivity control circuit varies the aperture (sensitivity), step by step, in accordance with the result of the comparison between the reference voltage Vref corresponding to a desired white level and the output voltage VD from the peak detecting circuit DET which comparison is made by the voltage comparing circuit VC. Alternatively, in order to improve the response of the sensitivity control operation, the 525 levels of aperture are related to binary signals, respectively, in advance, and an optimal aperture is determined in accordance with the output signal from the voltage comparing circuit VC. For example, about ½ of full-aperture (sensitivity 256) is set as a reference, and when the signal from the peak detecting circuit DET is larger than the reference voltage, the level of aperture is determined to be ¼ (sensitivity 128), whereas, when the former is smaller than the latter, the level of aperture is determined to be ¾ (sensitivity 384), and thereafter, an aperture obtained by halving each of the set level of aperture is determined to be a new set level. In this way, it is possible to obtain one optimal aperture from the 525 levels of sensitivity by carrying out the setting operation 10 times. If it is assumed that the above-described aperture setting operation, that is, the initial setting operation (VINE) of the vertical shift register VSRE for sensitivity control, is conducted during the vertical blanking period, it is possible to set an optimal aperture, that is, a white level of the video output signal V out, in accordance with the operation of reading signals from 10 frames.

In the solid-state image sensor in accordance with this embodiment, the sensitivity is automatically set at a desired white level by detecting a peak value (white level) of the video output signal V out from the solid-state image sensor circuit MID and by utilizing the sensitivity variable function thereof. It is therefore possible to maintain the white level at a constant one with respect to a plurality of still images such as those of letters or figures which have different levels of background lightness due to paper quality or the like. Thus, the digital pattern processing of the video output signal V out can be considerably readily executed. Further, the above-described sensitivity variable control can be electrically effected, and the response of the control operation is therefore excellent, which enables a high-speed image input operation in conjunction with the simplification of the digital pattern processing.

Since the sensitivity control circuit, peak detecting circuit and voltage comparing circuit can be fabricated in the form of a semiconductor integrated circuit, it is possible to achieve reduction in size and weight of the solid-state image sensor for image inputting operation.

Figure 2:
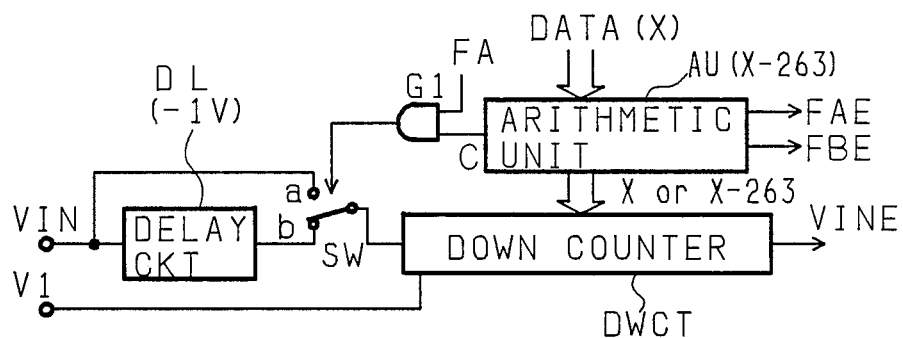
FIG. 2 is a block diagram of one example of a sensitivity setting signal generator circuit employed in the sensitivity control circuit of the embodiment shown in FIG. 1.

FIG. 2 is a block diagram showing one example of a signal generating circuit for sensitivity control which is provided in the above-described sensitivity control circuit.

In order to effect sensitivity control in 525 levels as described above, it is necessary to form a signal VINE which can be set so that the phase thereof differs from that of the signal VIN over a range from a phase difference corresponding to one row to a phase difference corresponding to 524 rows. Further, it is necessary to form a signal VINE which can be set so that the phase thereof differs from that of the signal VIN in the same way as the above for each of the odd- and even-number fields in the interlace mode. Therefore, there is a need for two 10-bit binary counter circuits.

In this embodiment, the following circuits are provided in order to simplify the counter circuit for setting a level of sensitivity.

Sensitivity control data DATA which is formed on the basis of the output signal from the voltage comparing circuit VC is supplied to an arithmetic circuit AU. The circuit AU subtracts 263 from the designated sensitivity X. If the result of this subtraction is negative (i.e., X−263<0), a control signal C is shifted to the low level and the sensitivity X is output as it is. In this case, an odd number field signal FAE for sensitivity control is raised to the high level. On the other hand, if the result of the subtraction is positive (X−263≧0), the control signal C is raised to the high level, and the subtraction result (i.e., X−263) is output. In this case, an even-number field signal FBE for sensitivity control is raised to the high level. A down counter circuit DWCT is supplied with either the output signal X or X−263 as its initial value. The down counter circuit DWCT is defined by a 9-bit counter circuit which performs a counting operation in accordance with the initial value.

The control signal C is supplied to an AND gate circuit G1. The other input terminal of the gate circuit G1 is supplied with the odd-number field signal FA for reading. The output signal from the gate circuit G1 instructs a switch SW to perform a switching operation. More specifically, when the odd-number field signal FA is available and if the subtraction result is positive, the switch SW is connected to the contact b as illustrated. In response to this, the down counter circuit DWCT is supplied with a signal VIN' which is formed by a delay circuit DL supplied with the signal VIN, the signal VIN' being delayed by a time corresponding to one row. When the control signal C is shifted to the low level, or when an even-number field is to be processed, the switch SW is switched over to the contact a. In response to this, the signal VIN is supplied to the down counter circuit DWCT. Upon receipt of either the signal VIN' or VIN through the switch SW, the down counter circuit DWCT starts counting the clock signal V1 supplied to the vertical shift register VSR. At the timing at which the output of the down counter circuit DWCT is made zero, the above-described sensitivity control signal VINE is generated. Thus, it is possible to form a timing signal VINE for sensitivity control which corresponds to each of the odd- and even-number fields by the operation of the down counter circuit DWCT consisting of 10 bits.

Figure 4:
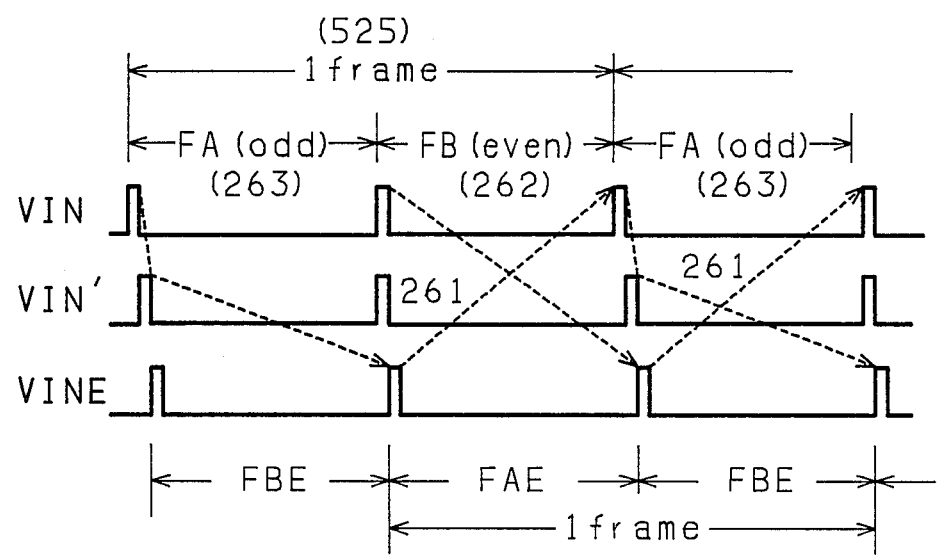
FIG. 4 is a timing chart employed to describe one example of the sensitivity control operation of the signal generator circuit shown in FIG. 2.

The sensitivity setting operation carried out by the arrangement shown in the block diagram of FIG. 2 will next be described with reference to the timing chart shown in FIG. 4.

To set the sensitivity X at, for example, 264, the arithmetic circuit AU presets the result (1) of subtraction of 264−263 in the down counter circuit DWCT. The arithmetic circuit AU further raises the even-number field signal FBE to the high level to indicate that this operation is setting of an input signal VINE with respect to the vertical shift register VSRE for sensitivity setting in regard to an even-number field. More specifically, it is instructed that sensitivity setting for an even-number field should be effected by using the input signal VIN for reading and for odd-number fields In response to the odd-number field signal FA for reading, the switch SW is connected to the contact b. Therefore, when the down counter circuit DWCT is supplied with the signal VIN' which is delayed with respect to the input signal VIN by the delay circuit DL by a time corresponding to one row, it starts counting. Accordingly, the output signal VINE is generated after the down counter circuit DWCT has counted 1, that is, the output signal VINE is delayed with respect to the input signal VIN by a time corresponding to two rows. Since the signal VINE corresponds to the even-number fields FBE as described above, if the sensitivity setting operation is conducted on the basis of this signal VINE, the vertical shift register VSRE for sensitivity control performs a shift operation in advance of the input signal VIN for reading and for the even-number fields FB by a time corresponding to 263−2=261 (rows). Thus, setting of a storage time (sensitivity) corresponding to a scanning time which in turn corresponds to 261 (525−264) rows is made with respect to the read operation for the even-number field in the first one frame.

For the odd-number field in the subsequent frame, the arithmetic circuit AU presets the result (1) of subtraction of 264−263 in the down counter circuit DWCT. When an even number field is to be started, the switch SW is switched over to the contact a in response to the low level of the signal FA. Therefore, when the down counter circuit DWCT is supplied with the input signal VIN as it is, the circuit DWCT starts its counting operation. Accordingly, the output signal VINE is generated after the down counter circuit DWCT has counted 1, that is, the output signal VINE is delayed with respect to the input signal VIN corresponding to the even-number field by a time corresponding to one row. If the sensitivity setting operation is effected on the basis of this signal VINE, the vertical shift register VSRE for sensitivity control performs a shift operation in advance of the input signal VIN for the odd-number field FA in the subsequent frame by a time corresponding to 262−1=261 (rows). More specifically, setting of a storage time (sensitivity) corresponding to a scanning time which in turn corresponds to 261(525−264) rows is made with respect to the read operation for the odd-number field in the same way as the above.

On the other hand, when the sensitivity X is to be set at, for example, 260, the arithmetic circuit AU presets the sensitivity 260 in the down counter circuit DWCT as it is since the result (−3) of substraction of 260−263 is negative. The arithmetic circuit AU further raises the odd-number field signal FAE to the high level to indicate that this operation is setting of the input signal VINE with respect to the vertical shift register VSRE for sensitivity setting in regard to an odd-number field. More specifically, it is instructed that sensitivity setting for an odd-number field should be effected by using the input signal VIN for reading and for odd-number fields. Further, the control signal C is shifted to the low level, thus causing the switch SW to be connected to the contact a. Therefore, when the down counter circuit DWCT is supplied with the signal VIN, it starts counting. Accordingly, the output signal VINE is generated after the down counter circuit DWCT has counted 260, that is, the output signal VINE is delayed with respect to the input signal VIN by a time corresponding to 260 rows. On the basis of this signal VINE, the vertical shift register VSRE for sensitivity control performs a shift operation in advance of the input signal VIN for the odd-number field FA in the subsequent frame by a time corresponding to 525−260=265 (rows). Thus, setting of a storage time (sensitivity) corresponding to a scanning time which in turn corresponds to 265 rows is made with respect to the read operation for the odd-number field in the subsequent frame.

For the even-number field in the subsequent frame, the arithmetic circuit AU presets the sensitivity 260 in the down counter circuit DWCT as it is in the same manner as the above. Further, the arithmetic circuit AU raises the even-number field signal FBE to the high level to indicate that this operation is setting of an input signal VINE with respect t the vertical shift register VSRE for sensitivity setting in regard to an even-number field. More specifically, it is instructed that sensitivity setting for the even-number field in the subsequent frame should be effected by using the input signal VIN for reading and for even-number fields. Since the operation conducted thereafter is the same as that in the above-described sensitivity setting for the odd-number field, description thereof is omitted.

Thus, the above-described set sensitivity X is in complementary relation to the actual sensitivity Y of the solid-state image sensor MID (i.e., Y=525−X).

The above-described embodiment provides the following advantages:

(1) In addition to a first scanning circuit which obtains a time-series output of signals from a plurality of picture element cells which are arrayed two-dimensionally, a second scanning circuit which effects a select operation in the vertical scan scanning direction with addresses independent of the select addresses in the vertical scanning direction which are used by the first scanning circuit, whereby the sensitivity is made variable by the control of the storage time. In addition, it is possible to make constant the white level used as a reference level for picture signals obtained from a plurality of kinds of documents or drawings having different levels of background lightness due to different paper qualities by utilizing the sensitivity control operation of the solid-state image sensor and controlling the scanning timing of the second scanning circuit so that the peak value (white level) of the output signal therefrom is maintained at a constant level. Thus, it is possible to readily execute the digital pattern processing of the picture signals.

(2) Since the above-described sensitivity can be varied for each frame, the response of the sensitivity control operation can be improved. Thus, it is advantageously possible to achieve a high-speed still image input operation in conjunction with the advantage (1).

(3) Since no mechanical diaphragm mechanism is employed for the lens but an automatic diaphragm activated by an electronic circuit is utilized, it is advantageously possible to reduce the size and weight of the image input device.

(4) Since the sensitivity variable function is carried to by an electronic circuit, it is possible to realize an image input device of high reliability.

Although the invention accomplished by the present inventors has been described by way of one exemplified embodiment, it should be noted here that the present invention is not necessarily limited to the described embodiment, but various changes and modifications may be imparted thereto without departing from the scope and gist of the invention. For example, the interlace gate circuit and the driver circuit in the solid-state image sensor circuit shown in FIG. 3 may be arranged in a variety of forms according to the scanning method employed. Further, these circuits may be arranged so as to perform an intermediate scanning operation for sensitivity setting by the use of the horizontal blanking period.

In addition, in order to prevent the white level of still images from being affected by the peak value of noise or the like, the video signal supplied to the peak detecting circuit DET may be rid of the white level affected by noise by means of a low-pass filter. The peak detecting circuit may have any type of practical arrangement, provided that the circuit operates to detect and hold the highest level of the input signal. In this case, the peak value held thereby is reset for each individual image. The solid-state image sensor circuit that is utilized in the present invention may also be applied to other devices in addition to the above-described MOS type solid-state image sensor, for example, image sensors employing CCDs (Charge-Coupled Devices). More specifically, the arrangement in this case may be such that a reset circuit is added which sweeps charges in photodiodes along a row which precedes a row which is to be subjected to reading, and this reset circuit is activated by the operation of a scanning circuit for sensitivity setting operation.

The present invention may widely be used for solid-state image sensors in the form of a still image input device or an eye of a robot.

The advantages obtained by a typical technique disclosed in this application will briefly be described below.

In addition to a first scanning circuit which obtains a time-series output of signals from a plurality of picture element cells which are arrayed two-dimensionally, a second scanning circuit which effects a select operation in the vertical scanning direction with addresses independent of the select addresses in the vertical scanning direction which are used by the first scanning circuit, whereby the sensitivity is made variable by the control of the storage/time. In addition, it is possible to make constant the white level used as a reference level for picture signals obtained from a plurality of kinds of documents or drawings having different levels of background lightness due to different paper qualities by utilizing the sensitivity variable function of the solid-state image sensor circuit and controlling the scanning timing of the second scanning circuit so that the peak value (white level) of the output signal therefrom is maintained at a constant level. Thus, it is possible to readily execute the digital pattern processing of the picture signals.

What is claimed is:

1. A solid-state imaging system comprising:
   a plurality of photo-electric converting elements;
   first means for selectively accessing said elements;
   second means for selectivity accessing said elements, said second accessing means operating independently of said first accessing means; and
   means for automatically setting and varying the timing difference between said first and second accessing means with respect to accessing said photo-electric converting elements in accordance with the output level of the converted electrical signals.

2. A solid-state imaging system according to claim 1, wherein said plurality of photo-electric converting elements comprise a photo-diode MOS transistor type of picture element array and wherein said means for effecting control of the timing difference includes means for detecting and holding the peak value of said output level, corresponding to the white level thereof, and comprising the peak value with a reference white level and timing means for automatically controlling said timing difference.

3. A solid-state imaging system comprising:
   a plurality of photo-electric converting elements, each one converting light information into an electrical signal;
   an accessing circuit for reading-out the converted signal from selected photo-electric converting element;
   a reset circuit for resetting the photo-electric converting elements prior to accessing them; and
   a feed-back circuit for automatically controlling the time difference between the resetting and accessing of the photo-electric converting elements in response to the potential level of said converted signal and in accordance with a preset desired level.

4. A solid-state imaging system according to claim 3, wherein said feed-back circuit is comprised of first means for detecting and holding the peak value of said converted signal which is read-out, corresponding to the white level thereof, second means for comparing said peak value with a reference white level, and a sensitivity controlling circuit for automatically controlling aperture of a solid-state circuit image sensor associated with said plurality of photo-electric converting elements, said sensitivity controlling circuit is responsive to an output of said second means and to an input signal and a clock signal from a driver circuit which supplies said solid-state image sensor circuit with a clock signal used during accessing so as to generate an output signal for controlling the time difference between accessing and resetting of the photo-electric converting elements.

5. A solid-state imaging system according to claim 3, wherein said accessing circuit is comprised of a vertical shift register for timely outputting signals at output terminals thereat in response to corresponding timing signals, an interlace gate circuit responsive to odd and even frame field control signals coupled between the output terminals of said vertical shift register and respective control inputs of a driving circuit, said driving circuit providing accessing signals for reading-out said converted signal at an output line and which are respectively associated with photo-electric converting elements corresponding to individual odd or even vertical scanning lines in response to an associated high level control input signal in accordance with said interlace gate circuit receiving a corresponding output of said vertical shift register and a corresponding field control signal, and wherein said plurality of photo-electric converting elements are comprised of a photo-diode array including a plurality of rows of photo-diode picture elements each including a pair of series-connected MOSFETs, activated in response to associated horizontal and vertical scanning signals, and a photo-diode in series therewith and being connected between a corresponding horizontal signal line and reference ground, wherein said horizontal signal line is coupled to said output line in response to an access signal from said driving circuit.

6. A solid-state imaging system according to claim 5, further including a plurality of MOSFET switches for respectively coupling a horizontal signal line associated with a vertical scanning line with said output line providing converting signal read-out.

7. A solid-state imaging system according to claim 5, wherein said reset circuit is comprised of a sensitivity control means for effecting variable resetting control of selected rows of photo-diode picture elements and including a second vertical shift register for timely outputting signals at output terminals thereat in response to associated second timing signals, a second interlace gate circuit responsive to odd and even frame field control signals coupled between the output terminals of said second vertical shift register and control inputs of a second driving circuit, said driving circuit resetting individual rows of picture elements via a dummy resetting output line in accordance with the timing of a corresponding output of said second vertical shift register and a frame field control signal controlling said second interlace gate circuit as controlled by said feed-back circuit.

8. A solid-state imaging system according to claim 7, wherein said feed-back circuit is comprised of first means for detecting and holding the peak value of said converted signal which is read-out, corresponding to the white level thereof, second means for comparing said peak value with a reference white level, and a sensitivity controlling circuit responsive to an output of said second means and to the input and a clocking signal associated with said vertical register of said accessing circuit which controls the scanning timing of said photo-diode array and in accordance with the read timing of the imaging system generating a corresponding output for effecting automatic control of the white level.

9. A solid-state imaging system comprising:
a plurality of photo-diode for accumulating electric charges in accordance with received light, a plurality of electronic switch elements respectively associated with each of said photo-diode for deriving therefrom the accumulated charges thereat that in response to an accessing signal output means coupled between said plurality of photo-diodes and an output line for deriving output signals representative of the amount of said charges in each of said photo-diodes being accessed; a reset circuit for resetting the accumulated charges in response to a reset signal prior to accessing them; a detection circuit responsive to serially-outputted signals and, a timing circuit for setting the timing difference of said reset signal from said accessing signal in response to the output of said detection circuit 10. A solid-state imaging system according to claim 9, wherein said detection circuit is comprised of a peak detector coupled to said output line for detecting and holding the peak value of an output signal, corresponding to the white level thereof, and a voltage comparator having a first input coupled to receive said peak value, a second input supplied with a reference value corresponding to a desired white level of an image being sensed by a solid-state image sensor circuit, comprised of said plurality of photo-diodes and an output coupled to said timing circuit.

11. A solid-state imaging system according to claim 10, wherein said timing circuit is responsive to the output of said voltage comparator and to an input signal and a clock signal from a driver circuit which supplies said solid-state image sensor circuit with a clock signal used during accessing so as to generate an output signal for controlling the time difference between accessing and resetting of the photo-electric converting elements.

12. A solid-state imaging system according to claim 11, wherein said plurality of photo-diodes are comprised of a photo-diodes are comprised of a photo-diode array including a plurality of rows of photo-diode picture elements associated with an image sensor circuit, each one including a pair of series-connected MOSFETs and a photo-diode in series therewith and connected between a corresponding horizontal signal line and reference ground, said series-connected MOSFETs are respectively activated in response to associated horizontal and vertical scanning signals, and wherein each horizontal signal line is coupled to said output line in response to an access signal from a scanning circuit via a MOSFET switch during read-out accessing.

* * * * *